United States Patent [19]

Landowski

[11] Patent Number: 4,984,085

[45] Date of Patent: Jan. 8, 1991

[54] IMAGE PROCESSOR WITH DARK CURRENT COMPENSATION

[75] Inventor: Roger W. Landowski, Waukesha, Wis.

[73] Assignee: Allen-Bradley Company, Inc., Milwaukee, Wis.

[21] Appl. No.: 388,884

[22] Filed: Aug. 3, 1989

[51] Int. Cl.$^5$ .......................... H04N 3/14; H04N 5/335
[52] U.S. Cl. ............................ 358/213.16; 358/213.31
[58] Field of Search .............. 358/213.16, 221, 213.11, 358/213.31, 464, 461

[56] References Cited

U.S. PATENT DOCUMENTS

| | | | |
|---|---|---|---|
| 4,128,830 | 12/1978 | Weythman | 340/146.3 |
| 4,216,503 | 8/1980 | Wiggins | 358/280 |
| 4,489,349 | 12/1984 | Okada | 358/168 |
| 4,525,741 | 6/1985 | Chahal et al. | 358/212 |
| 4,602,291 | 7/1986 | Temes | 358/213.16 |
| 4,625,330 | 11/1986 | Higgins | 382/27 |
| 4,628,362 | 12/1986 | Waehner | 358/174 |
| 4,754,338 | 6/1988 | Hideshima | 358/293 |
| 4,786,969 | 11/1988 | Shouji et al. | 358/213.16 |
| 4,819,071 | 4/1989 | Nakamura | 358/213.16 |

Primary Examiner—James J. Groody
Assistant Examiner—Wendy R. Greening
Attorney, Agent, or Firm—Quarles & Brady

[57] ABSTRACT

An CCD image sensor includes a number of detector sites which are shielded from exposure to light so as to produce an output signal indicative of the dark current from the sensor. The output signal from the sensor is digitized into a series of multi-bit numbers. As dark current picture elements are clocked from the sensor, a logic circuit detects when any one of several least significant bits of the multi-bit digitized sensor output signal has a given logic level. A switch, controlled by the logic circuit, applies a constant current to charge a capacitor so that the voltage across the capacitor will represent the magnitude of the dark current in the sensor output signal. The capacitor voltage is subtracted from the sensor output to provide an image signal in which the effects of the dark current are compensated.

11 Claims, 2 Drawing Sheets

IMAGE PROCESSOR WITH DARK CURRENT COMPENSATION

The present invention relates to image signal processing systems for evaluating objects present in the image, and more particularly to such systems utilizing a CCD imager and providing compensation for dark current in the image signal.

BACKGROUND OF THE INVENTION

As automated assembly equipment and robots become sophisticated, it is desirable to add the sense of vision to such devices. This would enable the equipment to locate the position of an object being manufactured, as well as to inspect the object for the presence of components or the proper location and size of specific features. To this end, various vision systems have been employed to generate a one or two dimensional electrical image of the workpiece which then can be electronically analyzed.

Conventional charge coupled device (CCD) image sensors have frequently been used in these vision systems. A CCD imager consists of a one or two dimension array of detector elements which accumulate electrical charge in proportion to the intensity of light striking them. After the charge is allowed to accumulate for a period of time, the detector elements are sequentially scanned and a video signal is produced in response to the charge in each element. The resultant video signal represents an image to be analyzed.

A certain amount of charge will accumulate in each detector element even when light does not strike that element. When such a detector element is scanned, a "dark current" is produced corresponding to the intrinsic charge accumulation. The dark current is a function of temperature, the period that charge was allowed to build up in each detector element and the electrical characteristics of the image sensor. Even detector elements exposed to light will have a portion of their accumulated charge due to the intrinsic charge buildup.

A common image analysis technique processes picture elements of the image which have a luminance above or below a set threshold level. For example, very bright picture elements having a luminance above a relatively high threshold may be counted and the sum used as an analysis parameter. In this technique, the dark current contribution to the video signal from the CCD image sensor can have a significant impact on the image analysis, as it affects the relative magnitude of the video signal luminance.

SUMMARY OF THE INVENTION

An image processor includes three sections for image acquisition, image processing, and video output signal generation. The three sections are connected by an address bus, a data bus and a set of control signal lines.

The image acquisition section includes a CCD image sensor array which produces an electrical signal representing the image. The image sensor includes a section which produces a signal representative of the dark current component of the image signal. An analog-to-digital converter digitizes the image signal from the image sensor into a series of multi-bit numbers. A gating circuit applies several of the least significant bits in the analog-to-digital converter output to a control circuit of a dark current reference voltage source. During the initial portion of the image sensor output signal that represents the dark current, these bits are gated to the control circuit.

The image acquisition section has a means for subtracting the output of the dark current reference voltage source from the image sensor signal. As the initial portion of the sensor output signal is being acquired, a feedback loop is formed to adjust the reference voltage source to produce an output that is proportional to the dark current. The output of the reference voltage source continues to be subtracted from the portion of the sensor signal that represents the image. The resultant image signal is thereby compensated for the effects of the dark current.

A general object of the present invention is to provide a mechanism which compensates for dark current in a signal from a CCD image sensor.

Another object is to provide compensation utilizing a digitized version of the dark current from the image sensor.

DETAILED DESCRIPTION OF THE INVENTION

Figure 1:
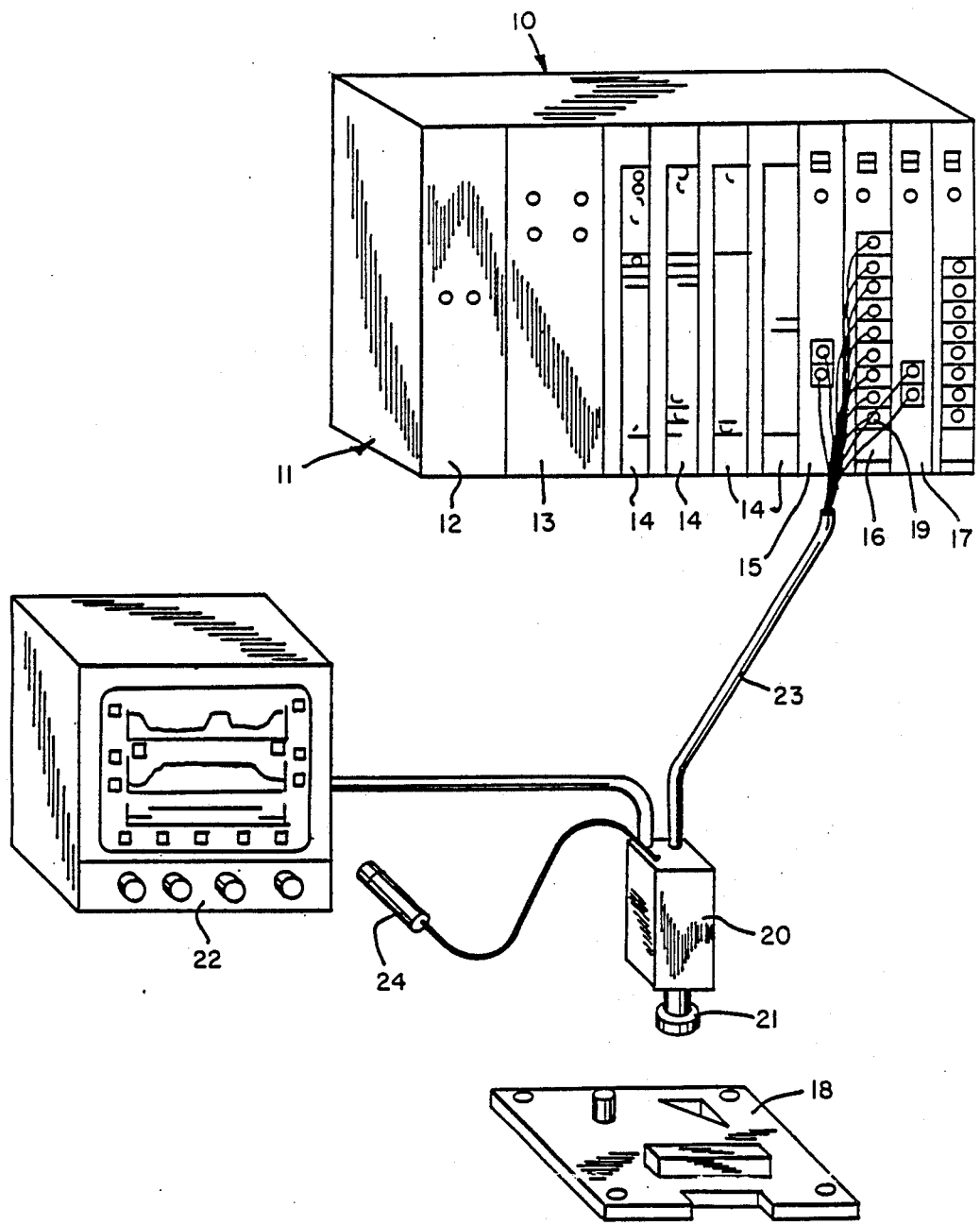
FIG. 1 is a pictorial representation of a programmable controller system which incorporates the present image processor.

FIG. 1 illustrates a conventional programmable controller 10, such as an Allen-Bradley PLC-2/15 System, which executes program instructions to operate a machine. The controller 10 includes a rack 11 in which a number of functional modules 13–17 are housed and interconnected by a mother board within the rack. The rack 11 includes a power supply 12 which provides electricity to each of the functional modules. A processor module 13 is included to store and execute a user defined control program governing the operation of the machine. Located elsewhere in the rack 11 are a number of input/output (I/O) modules 14–17 which interface the processor module 13 to sensing and operating devices on the controlled machine. One of these is a analog input module 15 which receives data from a sensing device in the form of an analog current signal between four and twenty milliamperes. This input module 15 digitizes the analog signal for transmission to the processor module 13. A conventional discrete dc input module 16 has eight input terminals 19 to which separate dc voltages are applied. Typically, each of these dc voltages represents the state of a sensor switch that responds to a given condition of the controlled machine. A serial communication module 17 also is included to provide data transfer capability between the rack 11 and a remote device using a standard serial protocol.

In the system shown in FIG. 1, the input terminals of both the analog input module 15 and the dc input module 16 are coupled to the outputs from a line scan image processor 20. The image processor 20 is positioned above a workpiece 18 so that features of the workpiece are focused by lens 21 onto a line scan sensor within the image processor. The workpiece 18 may be manually positioned beneath the image processor 20 or it may be moving along an assembly line (not shown). The image processor 20 produces a two dimensional video image which is displayed on a monitor 22 coupled to the processor. The display on monitor 22 depicts the luminance levels of image elements in the linear image from the line scan sensor and displays the results of the image processing. As used herein, the term "image element" refers to the portion of the linear image which corresponds to each imaging site of an image sensor in the processor 20.

A light pen 24 is connected to the image processor 20 so that the user can select icons displayed on the screen of monitor 22 to configure the processor. Once the image processor has been configured to evaluate a workpiece, the monitor 22 and the light pen 24 may be disconnected, if further monitoring of the processor's operation is not required.

The features and operation of the image processor 20 generally are similar to those of the image processor described in U.S. patent application Ser. No. 07/202,198, and assigned to the same assignee as the present invention. The image processor 20 produces a linear image of the workpiece which is digitized into a binary image. The user defines several regions within the linear image and the processor evaluates the image elements in each region. For example, the number of white or black binarized image elements in a defined region can be counted. The product of the evaluation is compared to the predefined upper and lower limits and the result of the comparison is fed to the programmable controller 10 via cable 23 in either of two formats. The first is a binary decision bit representing whether the evaluation product is within the upper and lower limits. This decision bit is applied to an input of the dc input module 16. The image processor 20 also generates a four to twenty milliampere current signal corresponding to the magnitude of a selected evaluation product. This current signal is applied to the analog input module 15.

Figure 2:
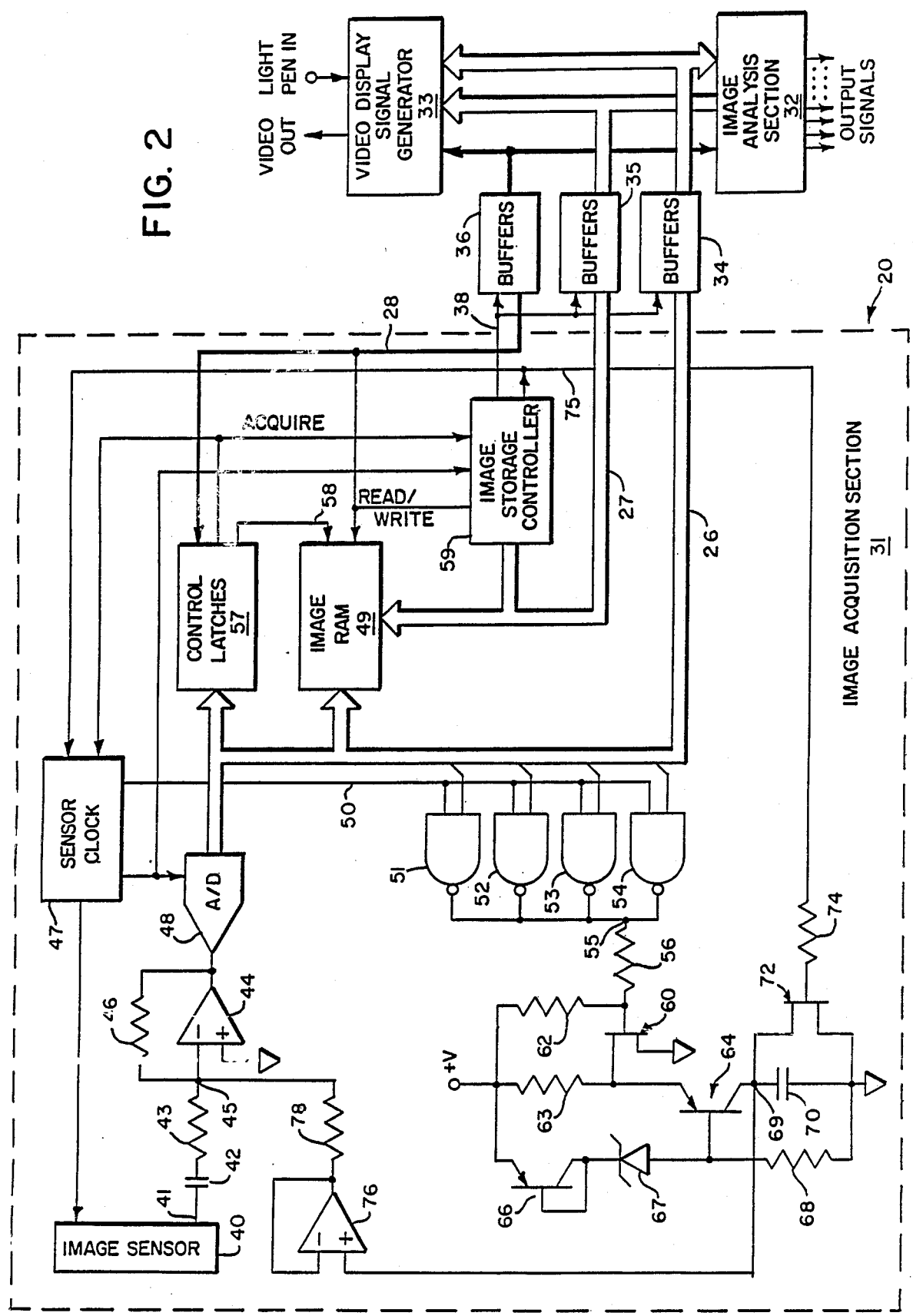
FIG. 2 is a schematic block diagram of the electrical circuit for the image processor.

The image processor 20 includes not only the line scan sensor, but all of the logic for interpreting the linear image according to user defined parameters and for generating output signals representing the results of that interpretation. FIG. 2 illustrates the details of the circuitry for the image processor, which is subdivided into an image acquisition section 31, an image analysis section 32 and a video display signal generator 33. Each of the three sections and their constituent components are interconnected by a set of three buses: an eight-bit parallel data bus 26, an sixteen-bit parallel address bus 27, and a bus of individual control lines 28 extending among various components of the image processor 20. The portions of the buses 26-28 which extend into the image acquisition section 31 are isolated from the portions which extend between the image analysis section 32 and the video display signal generator 33. The isolation is provided by three sets of tri-state data buffers 34, 35 and 36 which are controlled by a signal on line 38 from the image acquisition section 31. When an image is being acquired, the buffers are placed in their tri-state condition to isolate the bus portions within the image acquisition section to avoid bus contention with the other sections 32 and 33 of the image processor. When image acquisition is not occurring, the buffers 34-36 couple the bus portions together so that the image analysis section 32 can access the image data in section 31.

Although the image analysis section 32 and the video display signal generator 33 contain similar circuitry to that described in the aforementioned patent application, the present image processor 20 has a novel image acquisition section, which will be described in detail. Specifically, the image acquisition section 31 includes a line scan image sensor 40 such as a model TCD 142D manufactured by Toshiba America, Inc. This type of sensor has 2,048 individual detector sites located along a single line with each site corresponding to an image element in the image produced by the sensor. The sensor 40 is a charge coupled device which when activated accumulates a charge within the detector sites as a function of the light intensity striking each site. The detector site charges are sequentially clocked out of the device by a signal from a sensor clock 47 to produce an analog output signal on line 41 which serially represents the brightness level of each image element. The sensor output line 41 is coupled by capacitor 42 and a resistor 43 to an input 45 of an image signal amplifier 44. Resistor 46 provides a feedback path from the output of the amplifier 44 to its input.

The amplified image signal is applied to the input of an analog-to-digital converter 48, which receives a timing signal from the sensor clock 47. The analog-to-digital converter 48 transforms the analog signal into a series of bytes of data, each representing the brightness of an image element as one of sixty-four digital gray scale levels. In response to the signals from the sensor clock 47, each digital gray scale brightness level is coupled onto the data bus 26.

The multi-bit output from the analog-to-digital converter 48 is connected by the parallel data bus 26 to the data terminals of an image random access memory (RAM) 49. The image RAM 49 is an 8K × 8 static memory, thereby providing four sets of storage locations in which separate images can be stored. The selection of the specific set of storage locations in the image RAM 49, into which data are to be stored or from which data are subsequently read, is controlled by an output signal on data link 58 from a set of control data latches 57. As the brightness data for the image elements are being coupled to the data bus by the analog-to-digital converter 48, an image storage controller 59 applies a control signal to the image RAM 49 placing it in the write mode. At this time, the image storage controller 59 also applies an address signal via the address bus 27 to image RAM 49 sequentially accessing its storage locations to store the acquired image therein. The sequencing of addresses is in response to a signal from the sensor clock 47.

Another output from a control latch within set 57 provides a signal designated ACQUIRE, which instructs the sensor clock 47 and the image storage controller 59 that a new image should be acquired. The control latches 57 are coupled to the data bus 26 and receive control signals from the control lines 28. The control instructions are stored in the control latches 57 from the image analysis section 32.

When the image analysis section 32 requires image data to analyze, the section generates control signals over lines 28 to place the image RAM 49 in the read mode. Then storage locations in the image RAM 49 are addressed by the image analysis section 32 to obtain the image data over the data bus 26. The results of the analysis are sent to the video display signal generator 33 and to the programmable controller 10 via the output signal lines of cable 23.

The remainder of the image acquisition section circuitry illustrated in FIG. 2 provides a compensation mechanism for the dark current generated by the image sensor 40. Specifically, this portion of the circuitry includes four dual-input open drain NAND gates 51, 52, 53 and 54. One input of each of the NAND gates is connected in common to a control signal line 50 from the sensor clock 47. The other input for each of the NAND gates 51-54 is connected to a different one of the four least significant bit lines of the data bus 26. The outputs of the four NAND gates 51-54 are connected in common at node 55 to produce a logical OR'ing of those outputs.

The node 55 is coupled by resistor 56 to the gate electrode of a first transistor 60. The gate electrode is also connected to a supply of positive voltage (+V) by pull-up resistor 62. The drain electrode of transistor 60 is coupled by resistor 63 to the positive voltage +V and to the emitter of a second transistor 64. The source electrode of the first transistor 60 is connected to the circuit ground. The base electrode of the second transistor 64 is coupled to the source of positive voltage +V by a diode-connected transistor 66 and a Zener diode 67. A resistor 68 also connects the base of the second transistor 64 to the circuit ground. The Zener diode 67, transistor 66 and resistor 68 provide a temperature dependent bias to the base of the second transistor 64. Therefore, the second transistor's conductivity is a function of the image processor's temperature.

The collector of the second transistor 64 is connected to node 69 and a capacitor 70 extends between node 69 and the circuit ground. A discharge transistor 72 has its source-drain conduction path connected across the capacitor 70. Resistor 74 couples the gate electrode of the discharge transistor 72 to a control signal line 75 from the image storage controller 59. The control signal line 75 is also connected to an input terminals of the sensor clock 47.

Transistors 64 and 66, Zener diode 67, and resistors 63 and 68 form a temperature compensated current source which is used to place a charge on capacitor 70. The voltage caused by the charge on capacitor 70 is used to provide a dark current compensation voltage source. As will be described, the voltage at node 69 due to the charge on capacitor 70 corresponds to the amount of dark current from the image sensor 40. The node 69 of the dark current compensation voltage source is connected to the input of a unity gain noninverting amplifier 76. A resistor 78 couples the output of amplifier 76 to the input 45 of the image signal amplifier 44. This coupling combines the voltage at node 69 with the image signal to remove the dark current effects from the signal.

The CCD image sensor 40 includes a plurality of detector sites which are shielded from illumination. Prior to clocking the detector sites which store charge representing the image being sensed, the charges in the shielded sites are clocked out to produce an electrical signal representative of the dark current from the sensor. The signal generated from each shielded site hereinafter will be referred to as a dark current pixel. These dark current pixels are clocked through the image signal amplifier 44 and digitized by the analog-to-digital converter 48 to produce a series of multi-bit digital numbers on bus 26 which correspond to the magnitude of the dark current. As every other one of these dark current pixels, beginning with the first one, is clocked out of the sensor 40 and applied to the data bus 26, the sensor clock 47 will produce a high logic level pulse on line 50 which is applied to an input of each of the NAND gates 51-54.

At least one of the four least significant bits of the digital value for the first dark current pixel applied to the data bus 26 will have a high logic level. Therefore, at least one of the four NAND gates 51-54 will have a high logic level applied to both of its inputs, thereby producing a low logic level at node 55. This low logic level output turns off the first transistor 60, applying a brief current pulse through the second transistor 64 and capacitor 70. The pulse adds an incremental voltage equal to the product of the current pulse magnitude and the current pulse width divided by the capacitance of capacitor 70, to any existing voltage at node 69. The magnitude of the current pulse is limited to the breakdown voltage of Zener diode 67 divided by the resistance of resistor 63. The width of the current pulse is determined by the width of the clock pulse on line 50. The voltage at node 69 is buffered by amplifier 76 and summed with the output from the image sensor 40 at the input to the image signal amplifier 44. In effect, the voltage stored on capacitor 70 is subtracted from the signal representing subsequent dark current pixels from the sensor.

Initially the signal for the dark current pixels from the image sensor 40 will have a higher absolute voltage than the voltage at node 69. At this time, the four least significant bits on the data bus for the dark current pixels will produce a low logic level at node 55. Therefore, as every other dark current pixel is clocked through the image acquisition system 31, the charge on capacitor 70 and hence the voltage at node 69 increase. As the voltage at node 69 rises, the absolute value of the sum of the signals at the input 45 of the image signal amplifier 44 decreases. Correspondingly, the output of the analog to digital converter 48 decreases. By clocking every other one of the dark current pixel values through the NAND gates 51-54, the feedback circuit is allowed to stabilize between the selected dark current pixel samples.

Eventually, the capacitor 70 is charged to a level where voltage at node 69 equals the absolute value of the incoming dark current pixel voltage from the image sensor 40. At this point, the summation of voltages produces a zero potential at the input 45 to the image signal amplifier 44 and the analog-to-digital converter 48 produces a zero numerical value on the data bus 26. Once this occurs, all of the NAND gates 51-54 will receive a low logical level at their inputs coupled to the data bus 26, thereby maintaining a high logic level output when clocked by the sensor clock 47. As a result, the voltage potential at node 55 will remain high, maintaining transistor 60 is a conductive state so that the current flowing through resistor 63 is shunted to ground, and as such, is no longer available to charge capacitor 70. Thereafter, the charge on the capacitor remains substantially constant and the voltage at node 69 equals the voltage component of the image signal due to the dark current in the CCD detector element sites.

After all of the charges from the shielded detector sites have been clocked from the image sensor 40, the charges from the actual image sites are clocked out. During this latter phase, the sensor clock 47 applies a low logic level on line 50, which disables the NAND gates 51-54 from charging states due to the data bus bits. However, the dark current pixel voltage from node 69 continues to be subtracted from the sensor output signal as actual image data are clocked from the image sensor 40 and applied to the input of video amplifier 44. This provides dark current compensation of the signal input to the image acquisition section 31. Therefore, the output from the analog-to-digital converter 48 for the actual image will represent the intensity of the light which struck the corresponding image element sites, rather than representing a combination of the dark current and the light intensity.

After the signal from the last detector site has been clocked out of the image sensor 40, the sensor clock sends a pulse over line 75 which turns on transistor 72. This creates a shunt path which discharges capacitor 70 and resetting the circuit for dark current pixels from another image. This pulse also resets the sensor clock 47.

I claim:

1. A system which compensates for dark current in a signal from an image sensor comprises:
   means for digitizing the image sensor signal into a series of multi-bit numbers;
   a logic circuit for detecting when any one of a plurality of bits of a multi-bit digital number from said means for digitizing has a given logic level and producing an output signal indicative thereof;
   a voltage storage means;
   a switch means, controlled by the output signal of said logic circuit, for applying a voltage to said voltage storage means; and
   means for combining voltage from said voltage storage means with the signal from the image sensor.

2. The system as recited in claim 1 wherein said switch means comprises:
   a first transistor for providing a shunt path between a source of voltage potential and ground, and having a conductivity state determined by the output signal from said logic circuit;
   a second transistor having a conduction path coupled between the source of voltage potential and said voltage storage means and having a control electrode; and
   the control electrode coupled to the source of voltage potential by a Zener diode and a diode-connected transistor coupled in series.

3. The system as recited in claim 1 further comprising a means for resetting said voltage storage means.

4. The system as recited in claim 1 wherein said logic circuit comprises:
   a plurality of logic gates each having an input to which is applied a bit of the multi-bit digital number from said means for digitizing; and
   means for coupling output signals from said logic gates to produce a given signal when any of the bits applied to the inputs of said logic gates has a predefined value.

5. In an image processing system including an image sensor having a first group of detector sites which accumulate a charge in response to light striking the sites from an image projected onto the image sensor and a second group of detector sites shielded from light which accumulate a charge, the image sensor producing an output signal representing the amount of charge that accumulates in each of the detector sites, and the image processor also including means for digitizing the output signal into a series of multi-bit digital numbers; wherein the improvement comprises a dark current compensation circuit comprising:
   a logic means for detecting when at least one of a plurality of selected bits of a multi-bit digital number produced by digitizing the output signal from the second group of detector sites has a given logic level, and for producing an output signal indicative thereof;
   a capacitor;
   a means, controlled by the output signal of said logic means, for selectively applying a current through said capacitor; and
   means for combining a voltage across said capacitor with the output signal from the image sensor.

6. The system as recited in claim 5 wherein said means for selectively applying a current comprises a temperature compensated current source; and a switch means which applies current from said temperature compensated current source to said capacitor in response the output signal of said logic means.

7. The system as recited in claim 5 wherein said means for selectively applying a current comprises:
   a bipolar transistor having a base electrode, and an emitter-collector conduction path connected between a source of electricity and said capacitor;
   a control transistor for providing path for current from the source of electricity to bypass said bipolar transistor, and having a conductivity level determined by the output signal from said logic means; and
   the base electrode of said bipolar transistor connected to a bias circuit having a diode-connected transistor, a Zener diode and a resistor coupled in series between the source of electricity and ground.

8. The system as recited in claim 5 further comprising a means for discharging said capacitor.

9. The system as recited in claim 8 wherein said means for discharging comprises a switch element connected in parallel with said capacitor.

10. The system as recited in claim 5 wherein said logic means comprises:
    a plurality of logic gates each having an input to which is applied a bit of a multi-bit digital number from the means for digitizing; and
    means, responsive to output signals from said logic gates, for producing a given signal when any of the bits applied to the inputs of said logic gates has a predefined value.

11. A system for compensating for dark current in a signal from an image sensor comprising:
    means for digitizing the signal from the image sensor into a series of multi-bit numbers;
    means for detecting when any one of several selected bits of a multi-bit digital number from said means for digitizing has a given logic level;
    a source of a voltage level;
    means for altering the voltage level of said source in response to the detection, by said means for detecting, of a bit having the given logic level; and
    means for subtracting the voltage level of said source from the signal from the image sensor.

* * * * *